United States Patent Office 2,963,874
Patented Dec. 13, 1960

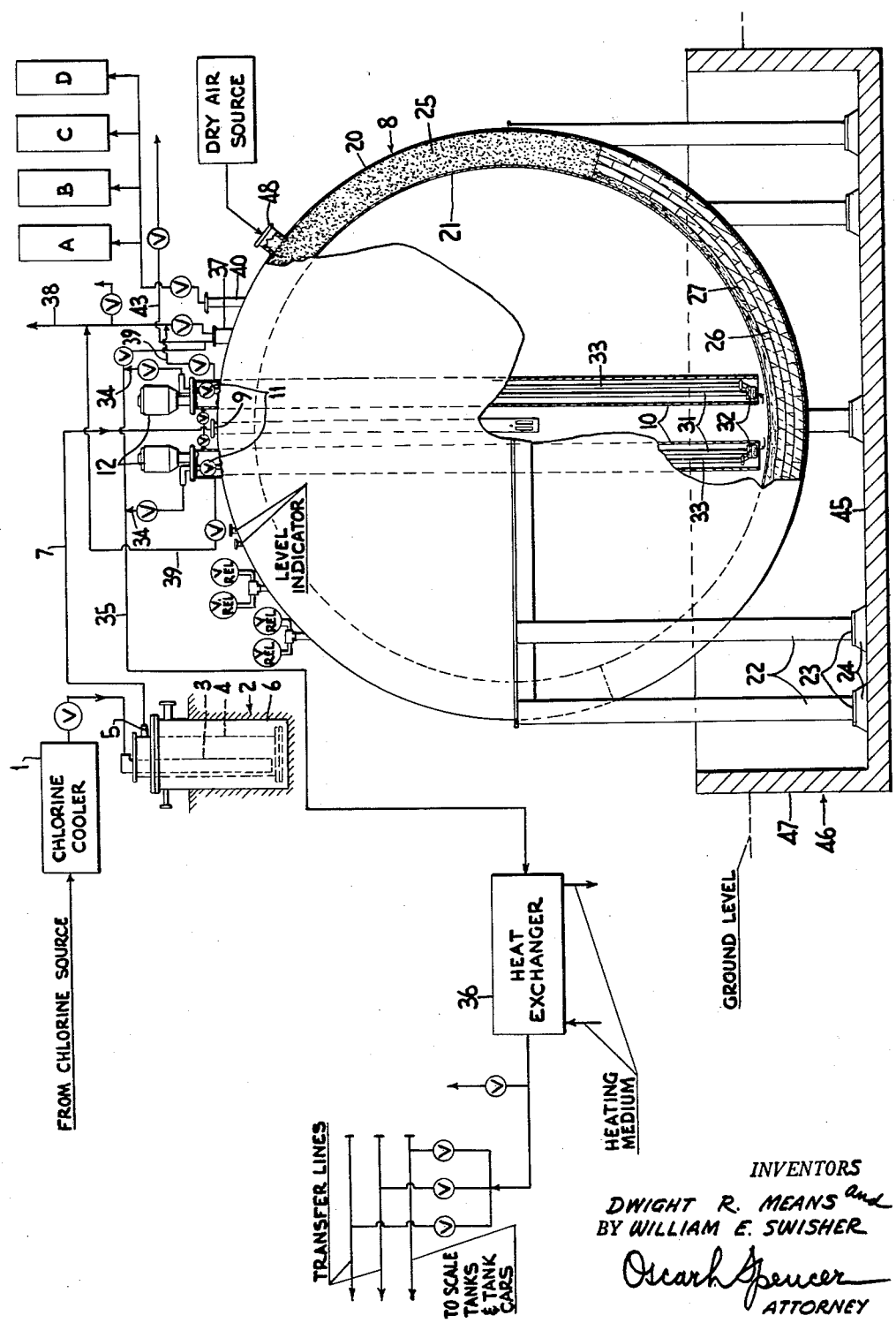

2,963,874

METHOD OF AND MEANS FOR STORING CHLORINE

Dwight R. Means, Pittsburgh, Pa., and William E. Swisher, Paden City, W. Va., assignors to Columbia-Southern Chemical Corporation, Allegheny County, Pa., a corporation of Delaware Filed Aug. 5, 1957, Ser. No. 676,194

3 Claims. (Cl. 62—50)

The present invention relates to the storage of liquid chlorine. In particular, the instant discovery concerns an improved process and apparatus for the safe storage of a very large volume of liquid chlorine.

Heretofore, liquid chlorine has been stored in relatively small containers or tanks under superatmospheric pressure for various reasons. In the first place, chlorine has the very low boiling point of minus 34.6° C. and must be refrigerated to remain liquid in a container whose outer surfaces are exposed to normal weather conditions. Because of the tendency for chlorine to gasify and create very high internal pressures in a container, manufacturers have for years stored this chemical in heavily-reinforced tanks of small diameter, generally cylindrical tanks. Conventionally, the liquid chlorine has been stored at temperatures above its boiling point but at superatmospheric pressures to maintain it liquid. The weight capacity of the containers used for this purpose generally averaged about 100 to 150 tons.

According to the present invention, however, it has been discovered that as much as several thousand tons or more of liquid chlorine can be stored safely in a single tank. Furthermore, the liquid chlorine is stored at substantially atmospheric pressure. The instant discovery also provides numerous other equally unprecedented and advantageous modifications in the art of liquid chlorine storage.

It has been found, according to the instant discovery, that by cooling chlorine gas to a temperature at which it is liquid at substantially atmospheric pressure, introducing the resulting liquid chlorine into a large, spherically-shaped, insulated zone whereby to establish a pool of liquid chlorine therein and permitting a small portion of the liquid chlorine in the pool to vaporize, the vapors being removed from the zone as they are formed, the temperature of the pool is kept substantially constant. Consequently, as will be seen hereinafter, most of the heat which finds its way into the pool with the incoming chlorine and most of the heat introduced into the pool through the walls of the zone is absorbed by vaporization of chlorine from the pool.

Furthermore, the present invention affords a novel, safe and efficient process for feeding chlorine to the pool and removing it therefrom, as well as numerous other safety modifications. All of these features will best be understood from the description which is to follow. However, while the invention is described in detail with respect to certain modifications thereof, it will be obvious to a skilled chemical engineer that the scope of the discovery is by no means limited thereto and that numerous variations are contemplated without deviating from the spirit and breadth of the discovery.

In the drawing, the figure is a specific embodiment of the invention shown partly as a schematic flow diagram and partly in side elevation.

Referring to the figure, cooler 1 is a low-temperature refrigeration unit capable of reducing the temperature of chlorine to slightly below its boiling point at atmospheric pressure. Cooling agents, such as Freon-22 (chlorodifluoromethane), may be used therein for this purpose.

In communication with cooler 1 is a seal loop 2, most of which is below ground level as shown. This seal loop 2 comprises a 6-inch pipe 3 fitted into a 10-inch pipe 4 which is sealed at its lower end, the smaller pipe extending to a point just short of the lower sealed end of the larger pipe and being disposed laterally of the central vertical axis of the larger pipe. Pipe 3 is open at each end, the upper end extending upwardly through and above the otherwise sealed upper end of pipe 4, that portion of pipe 3 extending through the top cover of pipe 4 being rigidly mounted thereto by welding or the like.

The 10-inch pipe 4 is, in turn, inserted into a 20-inch pipe 6 through the top cover thereof, pipe 4 being centrally located and extending to a point just short of the lower sealed end of pipe 6 and extending upwardly through and above the upper sealed end of pipe 6, pipe 4 being in fixed engagement with the cover of pipe 6 at the point at which it passes therethrough. Pipe 6 has closed-end conduits in the upper portion thereof as shown. Pipe 4 has an outlet 5 in that portion thereof which extends above and beyond pipe 6, outlet 5 being in communication with sphere 8 via conduit 7 which feeds into dip leg 9.

Leg 9 extends from a point just above sphere 8 downwardly through sphere 8 in a direction parallel and lateral to the central, vertical axis thereof to a depth of about the central, horizontal axis of sphere 8. The upper portion of leg 9 is in sealed engagement with sphere 8 where it passes through its shell. The lower portion of leg 9 has spaced apart openings therein (as shown) which prevent concentrated weight of falling liquid chlorine from hitting inner surface of sphere 8.

Two concentric shells, outer shell 20 and inner shell 21, comprise the body of sphere 8 which is supported by columns 22 having base plates 23 which rest upon concrete foundations 24, the upper ends of columns 22 being rigidly mounted on outer shell 20. The sphere 8 contemplated herein is of the general type described in U.S. Patents 2,337,049, 2,386,958 and 2,456,195 but contains essential differences which will be obvious from the description of the present invention.

In the space (about 12 inches wide) circumscribed by the inner and outer shells 20 and 21 is insulating material 25 which serves to thwart the infiltration of atmospheric heat into the interior of the sphere 8. Loose perlite aggregates 25 fill a major portion of the space; the lower portion of this space, however, is filled for the most part with cellular glass blocks 26 (e.g., "Foamglas" sold by the Pittsburgh-Corning Corporation, Pittsburgh 22, Pa.) which serve to support shell 21, the remaining area 27 (about one inch wide) in this lower portion being packed with fiber glass. These materials not only stand up under heavy loadings of the inner shell 21 but are also very effective in preventing heat infiltration.

Sphere 8 has mounted thereto a safe, novel and highly efficient chlorine discharge system comprising two vertical chlorine pumps 12 which have sleeves or cylindrical tubes 10 extending therefrom in vertical, parallel alignment to a point just short of the bottom of the inner shell of sphere 8. Each sleeve 10 encloses a pump shaft 31 at the end of which is a housing 32 just short of the bottom of tube 10 and having propeller blades therein for withdrawing liquid chlorine upwardly through conduit 33. At the upper end of conduit 33 in each sleeve 10 is a ball check valve 11 which prohibits excessive and too rapid withdrawal of liquid from the pool in the event of malfunctioning downstream from the valve 11.

Sleeves 10 are fixedly mounted in the top of sphere 8 on opposite sides of the central vertical axis running therethrough, the upper portion of each sleeve extending above the top of sphere 8 and being in communication with pump 12. The sleeves 10 are open at their bottom ends and sealed at the top ends, save for two openings in each of the tops thereof for admission of pump shafts 31 which pass therethrough to housings 32 and for admission of conduits 33 which pass therethrough and are in communication at the lower ends thereof with housings 32, respectively. Adjacent and just below that portion of conduits 33 passing through and fixedly mounted to the tops of sleeves 10 are ball check valves 11 which are in communication with conduits 33.

Superimposed on the top sealed ends of sleeves 10 are pump motors 12 which, when in operation, activate corresponding propeller blades (not shown) in housings 32 which are exposed to the liquid chlorine pool and draw liquid therefrom, thus forcing it upwardly through, successively, conduits 33, ball check valves 11, conduits 34 to conduit 35 leading to heat exchanger 36. In each conduit 34 is a valve to effect control of flow from the pool. Conduits 33 and 34 have expansion chambers therein (not shown) to absorb any abnormal pressure created when discharging the sphere 8. For example, if ball check valves 11 were to close suddenly because of malfunctioning downstream, the expansion chambers in conduits 33 would absorb the shock created by the resulting sudden back pressure in the system.

Heat exchanger 36 is any conventional indirect heat exchange unit wherein heat is transferred indirectly from a relatively warm medium, such as a brine solution, to the cold liquid chlorine to increase the temperature of the chlorine as desired.

To remove gaseous effluents forming in sphere 8 is provided outlet 37 which is mounted in shells 20 and 21 and feeds into conduit 38. Two separate tributaries 39 leading from the upper part of sleeves 10, respectively, feed into conduit 38 which may be discharged to the atmosphere or to a collecting system (not shown). Obviously, tributary conduits 39 collect any effluent gases passing upwardly through sleeves 10 and conduct them to conduit 38.

Conduit 43 is an auxiliary effluent-discharging means from outlet 37 and empties into the atmosphere or air.

Also similarly mounted in the upper curvature of sphere 8 is a second gaseous effluent outlet 40 useful for removing gases to drying towers A to D as shown, where they are thus returned to the chlorine processing system. That is, these are moist chlorine drying towers in a chlorine purification system wherein moist gaseous chlorine is scrubbed moisture-free in counter-current contact with $H_2SO_4$. The effluent from sphere 8 is thus admixed with moist gaseous chlorine and reprocessed. This is a significant feature of the invention since it permits a very economical method of salvaging chlorine as well as affording all the safety features above disclosed.

To insure greater safety, additional valves and a level indicator are mounted, as shown, in the upper part of sphere 8. As will be seen infra, whenever the pressure in sphere 8 reaches a predetermined value, these valves are automatically opened and gases released to the atmosphere.

As described hereinabove, sphere 8 is supported by columns 22 which rest upon plates 23 which, in turn, are mounted on concrete foundations 24. These foundations 24 are imbedded in the base or bottom 45 of a cement basin 46 having four walls 47 and being open at the top. These walls 47 extend from the base 45 (which is below ground level as shown) to a point about 4 feet above ground level, thus providing a dyke around the basin 46 to prevent surface liquids from flowing therein.

Were sphere 8 so located that flammable liquids escaping from a plant unit should flow toward the sphere 8, the dyke would prevent spillage into basin 46.

It is obvious that this structure contributes substantially to the safety of the unique storage system of the instant invention.

Still another very significant safety factor of the present discovery is the fact that all outlets from and inlets to sphere 8 are at the top of the sphere. For example, the discharge system described hereinabove is mounted on the top of sphere 8 and not on the bottom thereof. So also, stand leg 9, vent outlets 37 and 40, the level indicator and safety valves, etc., are all affixed to the top of sphere 8.

Should some or all of these inlets and outlets be attached to the bottom of the sphere, malfunctioning of any one of them caused by clogging due to erosion, by rupture, and the like, could create very hazardous conditions and/or occasion series spillage, etc. Consequently, the present discovery affords a storage system which is unprecedented.

As an even further precaution, basin 46 is so disposed below sphere 8 and is so constructed that any spillage from the sphere is received in the basin. Furthermore, the basin volume capacity, as will be seen hereinafter, is great enough to contain the maximum volume capacity of the sphere.

To render the possibility of hazards even more remote, another precautionary measure is taken with respect to the insulated space between shells 20 and 21 of sphere 8. Manhole 48 mounted on shell 20 is used to introduce dry air into the space from an exterior source of such air, as shown schematically in the drawing. This dry air purge prevents moisture from entering the space or jacket and freezing on the cold surface of the inner shell or sphere 8 during expansion and contraction of shells 20 and 21.

According to a specific embodiment of the present invention, chlorine at about minus 13.33° C. and at sufficient superatmospheric pressure to maintain it liquid is fed to cooler 1 where it is passed in heat exchange with a coolant, Freon-22, at about minus 40° C., and reduced to a temperature of approximately minus 34.44° C.

From cooler 1 the minus 34.44° C. liquid chlorine is fed to seal loop 2 which extends 45 feet below the ground level. The chlorine passes downwardly through pipe 3 of seal loop 2, upwardly through pipe 4 and exits through outlet 5 from whence it is delivered via conduit 7 and dip leg 9 to sphere 8.

The purpose of the seal loop 2 is to prevent any gases from blowing into the sphere 8. For instance, if the liquid chlorine fed to chlorine cooler 1 is derived from condensers used to prepare it from gaseous chlorine, there is a strong tendency for some gases in the chlorine condensers to blow through the system and find their way to the storage sphere. In view of this, seal loop 2 is provided which prevents any surging of gases into the sphere.

Since liquid chlorine being introduced into sphere 8 is about minus 34.44° C., its equilibrium pressure is approximately zero pounds per square inch gauge. Consequently, there is little or no flashing when the liquid chlorine passes into sphere 8 via dip leg 9 which extends better than half way down into sphere 8, i.e., about 25 feet therein, sphere 8 having an outside diameter of about 47 feet and an inside diameter of approximately 45 feet. Slots are provided (as shown) near the bottom of leg 9 to insure a minimum of flashing upon introduction of liquid chlorine at the rate of about 45,000 pounds per hour. Dip leg or stand leg 9 has a diameter of 4 inches and conduit 7 and the conduit from cooler 1 are 6 inches in diameter.

The rate of chlorine addition to sphere 8 may vary from 20,000 to 55,000 pounds per hour as desired. The slots provided in leg 9 are rectangular and measure about 6 x .5 inches in dimension.

To effect proper ventilation according to the present invention, the spherically-shaped zone is generally filled to less than about 95 percent volume capacity, thus leaving at least 5 percent of the total area of the zone as breathing space in which vapors given up by the chlorine pool may collect and from which they are removed substantially as rapidly as they collect. An exit means or outlet 37 is provided in communication with the vapor or breathing zone and vapors pass through the outlet 37 to the atmosphere or to a collecting means as will be seen hereinafter.

Ventilation in sphere 8, which has a total inner volume of 47,700 cubic feet, is effected by the fact that 2000 tons of liquid chlorine at minus 34.44° C. occupies only 86 percent of the total inner volume, or 41,022 cubic feet.

Vaporization from the pool is usually less than 0.01 percent by weight per hour, basis the total weight of liquid chlorine in the pool. At a 2000-ton load, for instance, under the conditions just given and in an average hour, vaporization takes place at the rate of between about 0.005 percent and 0.01 percent by weight per hour. These vapors are removed via outlet 40 to drying towers A, B, C and D substantially as formed, thus maintaining the chlorine pool in sphere 8 at substantially atmospheric pressure.

Dry air admitted to the space between shells 20 and 21 through manhole 48 is fed at a rate of about 50 cubic feet per hour, the dry air having a dew point of minus 40° C.

The safety valves provided in the sphere 8 are present to accommodate any excessive flashing that might occur (while introducing the chlorine) and/or any excessive vapor-pressure created by the infiltration of atmospheric heat into the system. For example, should a pressure of 15 pounds per square inch gauge or more be built up in sphere 8, these valves would open up and release the vapors causing excessive pressure.

To discharge sphere 8, one pump 12 or both pumps 12 are actuated and the corresponding valves in conduits 34 are opened. Thus, chlorine is passed through, successively, each ball check valve 11, conduits 34 and conduits 35 to heat exchanger 36 where, in indirect heat exchange with about a minus 17.78° C. brine solution, the liquid chlorine from sphere 8, which at that point is at about minus 34.44° C., or slightly higher, and at a pressure between 125 and 150 pounds per square inch gauge as a result of the pumping action, is heated to about minus 23.33° C.

From heat exchanger 36, the liquid chlorine is fed to scale tanks, tank cars or transfer lines, as desired.

Should any malfunctioning occur downstream from ball check valves 11, each of these valves will permit a flow of up to about 50,000 pounds per hour of chlorine, at which point they close.

Spherical tank or sphere 8 is suspended directly above basin 46 and is so disposed that any vertical axis from any point on the sphere would pass into basin 46.

Basin 46 has a 46,000 cubic foot volume capacity, while sphere 8 has a volume capacity when full of 47,700 cubic feet. Sphere 8 is operated at less than full volume, however, to effect the ventilation required according to the present invention. Two thousand tons of liquid chlorine at minus 34.44° C. fills but 86 percent of sphere 8, or 41,022 cubic feet thereof. Consequently, should the entire 2000 tons suddenly spill out of sphere 8, basin 46 would contain it all very conveniently.

The liquid chlorine from sphere 8 must be heated in heat exchanger 36 prior to being placed in scale tanks, tank cars, or the like, because these tanks will not tolerate such low-temperature liquid chlorine.

While the present invention has been defined in detail with reference to specific embodiments thereof, it is not intended that the details given be regarded as limiting the invention, except insofar as they are included in the appended claims.

We claim:

1. A tank for storing liquid chlorine comprising inner and outer concentric, spherical shells having insulation between them, a liquid chlorine feed conduit extending downwardly through the tops of said shells into the zone defined by said inner shell, said conduit being closed at the bottom and having openings provided near the bottom thereof, a liquid discharge conduit means extending from a point near the bottom of said zone upwardly through said zone and through the tops of said shells, and a vent gas conduit passing through the tops of said inner and outer shells.

2. A method of storing liquid chlorine of the order of 2,000 tons or more which comprises introducing liquid chlorine at substantially atmospheric pressure downwardly into a spherically-shaped, insulated zone near the midpoint thereof, dispersing said liquid chlorine entering said zone and establishing a pool of liquid chlorine therein which occupies less than 95 percent of the total volume of said zone, permitting less than 0.03 percent by weight per hour of the pool to vaporize, the vapors being removed from said zone as they are formed, thereby keeping the temperature of the pool substantially constant and maintaining the pool at substantially atmospheric pressure.

3. The apparatus of claim 1 wherein the openings are in the form of slots.

References Cited in the file of this patent

UNITED STATES PATENTS

| | | |
|---|---|---|
| 2,142,225 | Weichsel et al. | Jan. 3, 1939 |
| 2,386,958 | Jackson | Oct. 16, 1945 |
| 2,550,886 | Thompson | May 1, 1951 |
| 2,562,601 | Caquot et al. | July 31, 1951 |
| 2,725,722 | Ahlstrand et al. | Dec. 6, 1955 |
| 2,908,145 | Haumann | Oct. 13, 1959 |

FOREIGN PATENTS

| | | |
|---|---|---|
| 576,859 | France | May 22, 1924 |
| 895,642 | France | Apr. 11, 1944 |